United States Patent

Ishibashi

[11] Patent Number: 5,198,073
[45] Date of Patent: Mar. 30, 1993

[54] METHODS FOR TREATING THE SURFACE OF A SOLID BODY

[75] Inventor: Kazuo Ishibashi, Yokohama, Japan

[73] Assignee: Digital Equipment Corporation, Maynard, Mass.

[21] Appl. No.: 733,546

[22] Filed: Jul. 22, 1991

[30] Foreign Application Priority Data

Jul. 24, 1990 [JP] Japan .................................. 2-195996

[51] Int. Cl.⁵ .......................... B44C 1/22; C03C 15/00; C23F 1/00
[52] U.S. Cl. .................................. 156/659.1; 156/663; 156/665; 156/904
[58] Field of Search ................ 156/654, 655, 656, 657, 156/659.1, 663, 665, 667, 904

[56] References Cited

U.S. PATENT DOCUMENTS 4,460,621 7/1984 Pearlman ........................ 156/663 X
4,664,748 5/1987 Ueno et al. ...................... 156/904 X Primary Examiner—William A. Powell
Attorney, Agent, or Firm—Denis G. Maloney; Barry Young; Ronald Myrick

[57] ABSTRACT

A method for treating the surface of a solid to impart a desired degree of roughness by forming a large number of tiny indented points is disclosed. First, a large number of tiny liquid droplets is dispersed all over the surface of the solid. Then, a layer of a diluted solution of plastic dissolved in a volatile solvent is formed on the surface, covering the droplets. After the volatile solvent has evaporated, a plastic film containing a large number of tiny holes is formed on the surface of the solid. Etching is then done on the surface using the said plastic film as a mask, thus, a large number of tiny indented points are formed on the surface of the solid.

12 Claims, 2 Drawing Sheets

METHODS FOR TREATING THE SURFACE OF A SOLID BODY

The present invention relates to a method for treating the surface of a solid body to impart a desired degree of roughness, especially a method for treating the surface of a solid, such as glass, aluminum, ceramic, or others to form a large number of tiny indented points.

Traditional methods for treating the surface of a solid to control its roughness are as follows.

(A) By Abrasion

The desired surface roughness can be obtained by rubbing the surface of a solid with an emery tape so that many tiny points of uneven points (texturing) are formed on the surface.

(B) By Blasting

The desired surface roughness can be obtained by spraying tiny particles (blasting agent) onto the surface of a solid using water or compressed air so that many tiny points of uneven points are formed.

(C) By Photoetching

First, a negative image of the desired uneven pattern of the surface is exposed onto a layer of photosensitive material deposited on the surface of a solid. The portion of the photosensitive material that has been exposed to light becomes insoluble due to a photochemical reaction. The surface of the solid is then treated by a solvent. The insoluble portion of the photosensitive material remains on the surface of the solid, forming a mask. Next, a corrosive chemical is applied onto the surface of the solid, and then the mask is removed. The portion of the surface covered by the mask remains untouched by the chemical while the portion without the mask is corroded and becomes the indented portion. The desired surface roughness results from the formation of the many tiny points of uneven points.

According to the aforementioned methods (a) by abrasion and (b) by blasting, control of the shape and depth of, and the distance between, the uneven points is difficult, also, uniformity of the uneven points is also lacking. Also, when using these types of mechanical methods on solid materials such as glass or ceramic, there is a danger that surface might crack. Furthermore, complicated curved surfaces cannot be processed using method (a) by abrasion.

On the other hand, although the shape and depth of, and the distance between, the uneven points can be controlled precisely using the aforementioned method (c) by photoetching, this method takes more steps to perform and is therefore not suitable for mass and fast processing. Even if the most precise equipment is used, the best resolution obtainable in photoetching in reality is in the neighborhood of several microns, therefore, the size of the indented points formed cannot be smaller than this. Also, whether by contact exposure or projection exposure, exposure for a complicated curved surface cannot be done.

The present invention aims to provide a method for treating the surface of a solid in order to eliminate the aforementioned problems in the conventional technologies.

In accordance with principles of the present invention, a large number of tiny liquid droplets is dispersed all over the surface of the solid. A layer of a diluted solution of plastic dissolved in a volatile solvent is also formed on the surface. After the volatile solvent has evaporated, a plastic film containing a large number of tiny holes is formed on the surface of the solid. Etching is then done on the surface using the said plastic film as a mask, thus, a large number of tiny indented points are formed on the surface of the solid.

Figure 1:
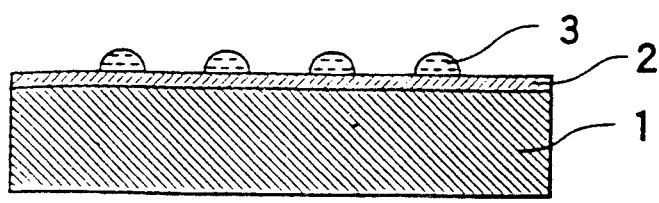
FIGS. 1-5 are schematic cross-sectional diagrams of the surface of a solid at respective steps in the method for treating the surface of a solid according to the present invention.

According to the method for treating the surface of a solid of the present invention, in order for a large number of tiny indented points to be formed on the surface of a certain solid, first, a water repellent is adsorbed onto the surface of the solid 1 so that a water repellent adsorbed layer 2 is formed, as shown in FIG. 1. A large number of tiny water droplets 3 are then formed atop the water repellent layer 2 on the surface of the solid 1. Droplets 3 may be formed when the surface of the solid 1 is exposed to the atmosphere at room temperature after being cooled to a temperature below the dew point. These tiny water droplets 3 can also be formed by spraying water onto the surface of the solid 1. The purpose of the water-repellent adsorbed layer 2 is to prevent the water droplets from flattening out due to their spreading-out by wetting on the surface of solid 1.

Figure 2:
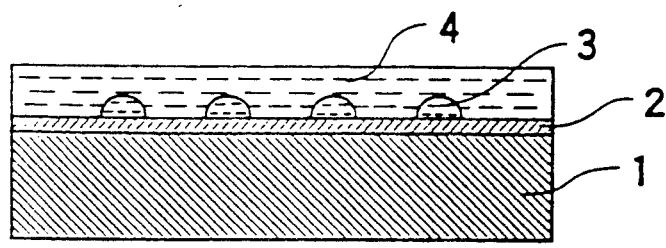

Next, as shown in FIG. 2, a diluted plastic solution layer 4 is formed over the top of the water repellent layer 2 and the tiny water droplets 3. This diluted plastic solution layer 4 may be formed by spreading a diluted plastic solution, obtained by dissolving a plastic material in a volatile organic solvent, onto the water repellent layer 2 and droplets 3 atop the surface of the solid 1. The same layer can also be formed by dipping the solid into the said solution and pulling it out.

Figure 3:
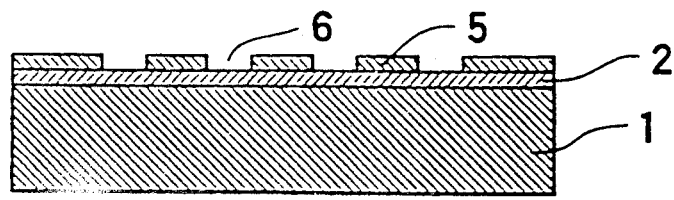

The solvent and water droplets are then allowed to evapoate. After the solvent and water droplets have evaporated, a thin plastic film 5 with circular holes 6 located at points corresponding to where the water droplets used to be is formed, as shown in FIG. 3.

Figure 4:
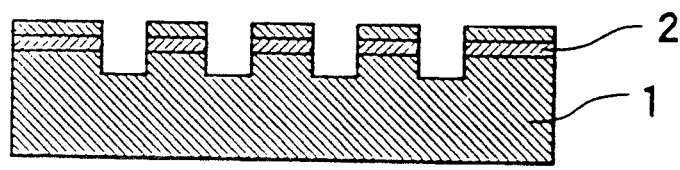

Using this plastic layer 5 containing a large number of tiny holes 6 as a mask, the portion of the surface of the solid 1 corresponding to the holes 6 of the plastic layer 5 is etched, as shown in FIG. 4, using a suitable acid which will react with the material of the surface of the solid 1.

Figure 5:
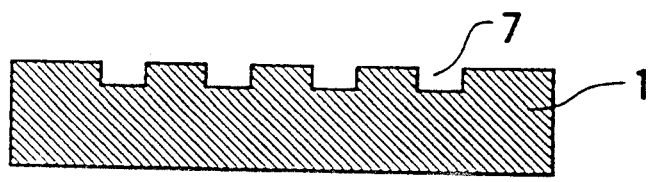

Finally, after washing with an organic solvent or pure water to remove the plastic layer 5 and the water-repellent adsorbed layer 2, a surface of the solid containing a large number of circular indented points 7 is obtained, as shown in FIG. 5.

In order for the aforementioned mask consisting of the plastic film to be formed, the following method can also be used. First, the surface of the solid, which has been treated with a water repellent, is dipped into a diluted plastic solution that has been cooled down to near the dew point, and is then pulled out so that a layer of plastic solution is formed on the surface of the solid. Latent heat of vaporization during evaporation of solvent in the plastic solution causes the temperature at the surface of the solution to drop below the dew point, causing water droplets to be formed on the surface of the plastic solution due to condensation of moisture in the atmosphere.

Because the solution is isolated from the atmosphere by the water droplets, the volatile solution under the water droplets does not evaporate. In other words, as long as the volatile solution is under the water droplets, it remains in liquid form and flows. This portion of liquid flows away from under the water droplets and evaporates when it comes into contact with the atmosphere. As a result, holes in the remaining plastic film are formed at the spots, where water droplets used to be, after all the volatile solution has evaporated, and a mask consisting of a plastic film, such as the one mentioned above, is formed.

According to this method of mask formation, formation of the water droplets and evaporation of the plastic solution occur concurrently, which is operationally convenient. The rest of the process is the same as the one described previously.

In the method for treating the surface of a solid described above according to the present invention, the distance between two adjacent circular indented points 7 (see FIG. 5) and their diameter can be controlled by varying the distance between the tiny water droplets and their diameter. The distance between two adjacent water droplets is determined by the hydrophobic strength of the water repellent; the stronger the hydrophobic strength of the water repellent is, the closer the distance between two adjacent water droplets.

The diameter of the water droplets depends on the difference between the atmospheric dew point and the temperature to which the surface of the solid has been cooled; the larger the difference is, the larger the diameter. The size of the holes 6 in the plastic layer (see FIG. 3) can be controlled uniformly to a minimum of several hundredths of a micron—far smaller than that obtainable by photoetching—by setting the conditions described above. Depth of the indented points 7 in the solid (see FIG. 5) can be controlled by varying the concentration of the acid used in etching and/or the length of etching time. Following the above methods, the distance between two adjacent indented points 7, their diameter, and their depth can be controlled over a wide range. The indented points 7 formed in this way are, in principle, isotropic with respect to the surface of the solid.

Because water droplets spread easily by wetting on a clean metal or glass surface, a water-repelling process, as described previously, is necessary in general. If the material of the solid itself is water repellent, however, the water-repelling process may not be necessary. But, when a distance between two adjacent water droplets that is different from that which is determined by the inherent water repellency of the material of the solid is desired, the distance between two adjacent water droplets can still be controlled by using a water repellent as described above.

Although tiny water droplets are formed on the water repellent adsorbed layer in the aforementioned examples, the present invention is not limited to the formation of water droplets; any suitable liquids, besides water, which are capable of: (a) forming into tiny liquid droplets on the surface of the solid to be treated; and (b) not mixing those droplets in with the plastic solution, can be used.

Next, based on the principles of the method for treating the surface of a solid of the present invention as described above, more concrete examples of the treatments of the surface of a variety of solids will be explained.

In a magnetic disk device, an air-lubricated surface formed by a fast-rotating disk causes the magnetic transducer head to float on the layer of air. In this case, an effective way of increasing the recording density of the magnetic disk device is to lower, as much as possible, the height at which the magnetic transducer head floats. For this reason, a substrate with superior surface smoothness is required for use in a magnetic disk.

When the disk drive is constructed to implement the contact start/stop method (a method in which the head comes in contact with the disk surface when the disk is stationary), however, if the surface of the magnetic disk media is too smooth, the friction resistance which occurs when the disk surface comes in contact with the magnetic head becomes large, which causes scratches on the surface of the disk or the head. In addition, liquid lubricant applied onto the medium surface or moisture in the atmosphere might cause an adsorption phenomenon to occur on the head when the disk is stationary. The starting torque also increases. In order to prevent the occurrences of these inconvenient phenomena, a proper level of surface roughness on the disk medium is necessary.

Traditionally, rubbing by an emery tape is done as a means to provide surface roughness like this, but, as described before, problems exist in this method. According to the principles described previously, the method for treating the surface of a solid of the present invention enables the formation of tiny indented points having the most appropriate distance between two adjacent indented points, diameter, and depth, for the particular material and film thickness of the magnetic disk medium, material of the head, and shape of, the surface. Therefore, by applying the method for treating the surface of a solid of the present invention, problems in the conventional technologies can be overcome, thereby providing a substrate of a magnetic disk which is superior in friction characteristic, wear characteristic, and starting characteristic, and does not cause adsorption phenomenon on the head.

After being washed in pure water by the ultrasound method, a substrate, made of soda-lime glass, is placed in a water repellent for 30 minutes and dried. A 0.03% by weight water solution of distearyl dimethylammonium chloride is used as the water repellent. After being treated with a water repellent, the glass substrate is cooled in a refrigerator to a temperature several degrees below the dew point (approximately 120° C. when room temperature is 200° C. and relative humidity is 60%) and then taken out to be placed in the room. While being maintained in vertical direction, the glass substrate is dipped into a 0.3% by weight ethyl acetate solution of cellulose acetobutyrate (plastic), and is immediately pulled out and dried. The resulting substrate is observed under a differential interference microscope, and circular holes with a diameter of approximately 2 microns are found to distribute uniformly on the plastic layer with a distance between two adjacent circular holes of approximately 4 microns.

As an alternate way to form a plastic mask like this, after being treated with water repellent, the aforementioned glass substrate is dipped into the aforementioned plastic solution which has been maintained at 140° C. and pulled up; water droplets are formed on the surface of the solution, and after the solution has dried out, a plastic film containing holes with approximately the same diameter and the same distance between two adjacent holes as that of the aforementioned plastic film is obtained. As described above, the size of these holes and the distance between two adjacent holes can be adjusted by adjusting the level of cooling of the substrate and the concentration of the water repellent, respectively. Next, this glass substrate is etched for 4 minutes using 0.1% by weight hydrofluoric acid, and after being washed by ultrasound means using acetone or pure water to remove the plastic film and the water-repellent adsorbed layer, a glass disk substrate having circular indented points with the same diameter as the holes that were on the plastic film and with a depth of approximately 500 angstroms is obtained.

The present invention is also applicable in treating the circumferential surface of optical fibers because minute indented points having depths in the order of hundredths of microns can be formed and curved surfaces can be treated according to the principles of the method for treating the surface of a solid of the present invention.

When an optical fiber bundle is used to guide light from a light source and intended to allow light to scatter at certain designated locations, an effective method is to let a small amount of light leak out from the fibers by providing minute scratches at the designated locations on the surface of the fibers. This method can be used, for example, in a so-called photosynthesis bioreactor. A photosynthesis bioreactor is used to cultivate algae, absorb carbon dioxide, and generate oxygen by guiding light into a culture fluid to accelerate photosynthesis of algae in the culture fluid.

For a large-scale operation, a deeper and larger water tank is needed. Since light transmissivity of the culture fluid is rather poor, however, optical fibers are used to allow scattering of light in the culture fluid. As the algae grow thicker, they begin to block the light, resulting in the lowering of photosynthesis efficiency. In addition, when light is directed in from a specific direction, shadows are formed. Even after the algae have grown thicker, it is necessary to let the most appropriate amount of light for photosynthesis reach uniformly across all the algae. Therefore, optical fibers with minute scratches on their circumferential surface are arranged inside the water tank. A small amount of light is allow to leak out from the scratches on the circumferential surface of the optical fibers and is scattered. In this way, light shines in all directions from the optical fiber bundle to illuminate the interior of the water tank uniformly. By arranging the optical fibers appropriately inside the water tank, the water tank can be illuminated without any shadows even after the algae have grown thick.

The efficiency of a photosynthesis bioreactor operated in this way is influenced significantly by the adjustment of the manner in which light is allowed to leak out from the optical fibers. If too much light is allow to leak out too soon along the fiber, light will be exhausted before reaching the depth of the water tank; if too little light is allowed to leak out, insufficient light scattering results along the way. Also, in order for the leaked light to be scattered in all directions, the size of the scratches must be in the range of the wavelength of the visible light. If the scratches are too large, some of the light that crosses over the internal allowable propagation angle resulting from interfacial reflection due to the scratches leaks out through the opposite side of the scratched surface, resulting in directional scattered light.

Therefore, the character of the scratches on the circumferential surface of the optical fibers, or in other words, the surface condition of the optical fibers, such as the depth, size, and density of the scratches, has to be controlled precisely. The method for treating the surface of a solid of the present invention is also effective in this type of surface treatment. According to the method for treating the surface of a solid of the present invention, tiny curved surfaces, such as that of the optical fibers, can be uniformly processed. Sufficiently minute holes with respect to the fineness of the optical fiber can be formed, and the density and depth of the holes can be controlled.

The method for treating the surface of a solid in accordance with the present invention may also be applied in plating of smooth surfaces. In general, plating is formed on a smooth surface, therefore, it normally has a shiny finish. In some cases, this causes the surface to look cheap, and the surface may be too slippery to be held tightly. Therefore, by providing an appropriate roughness to the plated surface, the resulting products appear to be warmer, and have a feeling of heaviness, without shininess, and by having an appropriate amount of friction, they can be held securely. According to the method for treating the surface of a solid of the present invention, sufficiently shallow holes with respect to the thickness of the plating can be formed, and diameter of the holes and the distance between two adjacent holes can be controlled over a wide range; therefore, many different styles of looks can be achieved. Using the plated finish treated in this way, writing tools, for example, which are rust-proof, are easy to hold, and look high class can be made.

As described above, according to the method for treating the surface of a solid of the present invention, uniform tiny indented points with a controlled diameter, distance between two adjacent indented points, and depth can be formed on the surface of a solid.

By applying the present invention to the manufacturing of magnetic disk media, disk substrates with excellent durability and wear resistance can be obtained. In this case, by selecting an appropriate water repellent and an etching agent in accordance with the material used for the substrate, materials such as glass, aluminum, ceramic, and others can be used as material for the substrate. Also, since a number of substrates can be lumped together to be treated, this method is also economically superior.

Also, since curved surfaces can be treated as well as flat surfaces, according to the method of the present invention, this method can be applied to a wide range of technical fields such as the control of light scattering from the optical fibers, treatment of the plated surface of a writing tool, and others.

In addition to the wide range of applications in the control of the various characteristics of the surface of a solid, such as bonding, adhesion, friction coefficient, shininess, and rate of light reflection and transmissivity, as described above, the present invention can also be applied in the control of other characteristics of the surface of a solid such as painting, wetting, and the retention of lubricant.

What I claim is:

1. A method for treating the surface of a solid body by forming a large number of tiny indented points, comprising the steps of:

dispersing a large number of tiny liquid droplets over said surface;

forming a layer of a diluted solution of a plastic dissolved in a volatile solvent on said surface;

evaporating the volatile solvent, forming a plastic film containing a large number of tiny holes on said surface of the solid; and etching said surface using said plastic film as a mask.

2. The method of claim 1 wherein said liquid droplets are water droplets.

3. The method of claim 2 wherein said dispersing step comprises the steps of:

adsorbing water repellent on said surface to form a water-repellent adsorbed layer;

cooling said surface to a temperature below the atmospheric dew point; and exposing said surface to the atmosphere at room temperature, forming said tiny water droplets.

4. The method of claim 2 wherein said dispersing step comprises the steps of:

adsorbing water repellent on said surface to form a water-repellent adsorbed layer; and forming said droplets by spraying water onto the said water repellent adsorbed layer.

5. The method of claim 2 wherein said said dispersing and forming steps comprise the steps of:

adsorbing water repellent on said surface to form a water-repellent adsorbed layer;

dipping said surface into a volatile plastic solution that has been cooled down to near the dew point; and pulling said surface out of said solution, simultaneously forming said layer of volatile plastic solution and dispersing said tiny water droplets.

6. The method of claim 1 wherein said surface is a lubricated surface.

7. The method of claim 1 wherein said surface is a gas-lubricated surface.

8. The method of claim 1 wherein said surface is the surface of a substrate of a rotating disk.

9. The method of claim 8 wherein said substrate of a rotating disk is the substrate of a magnetic disk.

10. The method of claim 1 wherein said surface is the surface of optical fibers.

11. The method of claim 1 wherein said surface is a plated surface.

12. A method for treating the surface of a solid by forming a large number of tiny indented points, comprising the steps of:

adsorbing water repellent on said surface to form a water-repellent layer;

dipping said surface into a volatile plastic solution that has been cooled down to near the dew point;

pulling said surface out of said solution simultaneously forming a layer of said volatile plastic solution and a large number of tiny liquid droplets atop said solution layer;

evaporating the volatile solvent, forming a plastic film containing a large number of tiny holes on said surface of the solid; and etching said surface using said plastic film as a mask.

* * * * *